United States Patent [19]

Wolfe et al.

[11] 4,139,748

[45] Feb. 13, 1979

[54] SECONDARY CONTACTS FOR DRAWOUT SWITCHGEAR

[75] Inventors: Jerome K. Wolfe, Franklin Borough; Jack G. Hanks, Bethel Park; James O. Rexroad, Beaver, all of Pa.

[73] Assignee: Westinghouse Electric Corp., Pittsburgh, Pa.

[21] Appl. No.: 757,103

[22] Filed: Jan. 5, 1977

[51] Int. Cl.² .............................................. H01H 9/20
[52] U.S. Cl. .............................................. 200/50 AA
[58] Field of Search ............ 200/50AA; 361/335–339, 361/343, 344, 345

[56] References Cited

U.S. PATENT DOCUMENTS

| 2,647,247 | 7/1953 | Fulton et al. | 200/50 AA X |
| 2,777,024 | 1/1957 | West | 200/50 AA |
| 2,858,389 | 10/1958 | Cuorato et al. | 200/50 AA |
| 2,883,483 | 4/1959 | Horn | 200/50 AA |
| 3,188,415 | 6/1965 | Netzel | 200/50 AA |
| 3,578,925 | 5/1971 | Drown et al. | 200/50 AA |
| 4,020,301 | 4/1977 | Ericson et al. | 200/58 AA |

Primary Examiner—James R. Scott
Attorney, Agent, or Firm—L. P. Johns

[57] ABSTRACT

Retractable secondary contacts characterized by stationary and movable secondary contacts, one of which stationary and movable contacts is retractably mounted on a drawout circuit breaker, the other of which stationary and movable secondary contact is mounted on a cell into which the drawout circuit breaker is movable, one of the movable and fixed secondary contacts being retractably mounted to enable closing of the stationary and movable secondary contacts before closing of primary terminal means and after opening of the primary terminal means, whereby remote breaker operations, such as metering, may be tested prior to closing of the primary contact means.

5 Claims, 12 Drawing Figures

SECONDARY CONTACTS FOR DRAWOUT SWITCHGEAR

CROSS-REFERENCE TO RELATED APPLICATIONS

This invention is related to the inventions disclosed in the copending applications Ser. No. 757,104, filed Jan. 5, 1977, and Ser. No. 757,102, filed Jan. 5, 1977 now U.S. Pat. No. 4,112,269.

BACKGROUND OF THE INVENTION

1. Field of the Invention

This invention relates to drawout switchgear and, more particularly, it pertains to retractable secondary disconnects for drawout switchgear.

2. Description of the Prior Art

When circuit breakers are mounted in cells as drawout switchgear, the primary purpose is to provide a disconnect of the breaker from the line and load bus bars. There are, however, other connections to the breaker, such as power to wind-up mechanisms, remote operator controls, wiring to meters from current transformers and the like. These connections, comprising up to 48 connections, must be disconnected when the breaker is removed from the cell and are referred to as secondary connections. One requirement of drawout switchgear is a test position in which the line and load connections are broken, but the secondary connections are closed, allowing the breaker to be tested without actual engagement to the main bus bars. Since engagement of the secondary connections is necessary in two different positions, the secondary contacts must allow for the distance between positions. In the past this has been handled by providing sliding secondary contacts. However, they have involved the disadvantages of fragility and maintenance of slide alignments.

SUMMARY OF THE INVENTION

In accordance with this invention it has been found that the foregoing disadvantages may be overcome by providing drawout switchgear comprising a cell having an opening at the front end thereof, a circuit interrupting unit movable into and out of the cell, stationary primary terminal means supported in the cell, stationary secondary terminal means supported in the cell, movable primary terminal means on the circuit interrupting unit movable therewith, movable secondary terminal means on the circuit interrupting unit and movable therewith, retractable secondary contact means and fixed secondary contact means movable into and out of contact with each other, the retractable secondary means being mounted on the circuit interrupter and the fixed secondary means being mounted on the cell, retractable means mounting the retractable secondary contact means on the circuit interrupter unit and comprising coil spring means and guide pins for aligning the retractable secondary contact means and the fixed secondary contact means, the circuit interrupter unit being movable between a disconnected position, intermediate position, and the connected position, in the disconnected position the stationary primary terminal means being disengaged from the movable primary terminal means and the secondary contact means being disengaged, in the intermediate position the primary terminal means being disengaged and the secondary contact means being engaged, and in the connected position the primary terminal means being engaged and the secondary contact means being engaged.

The advantage of the device of this invention is that it provides means for prealignment of contacts before engagement, as short positive engagement rather than a long slide contact, and coil springs which take up the travel distance between the intermediate and connected positions, whereby a more rugged device is provided.

DESCRIPTION OF THE PREFERRED EMBODIMENTS

Figure 1:
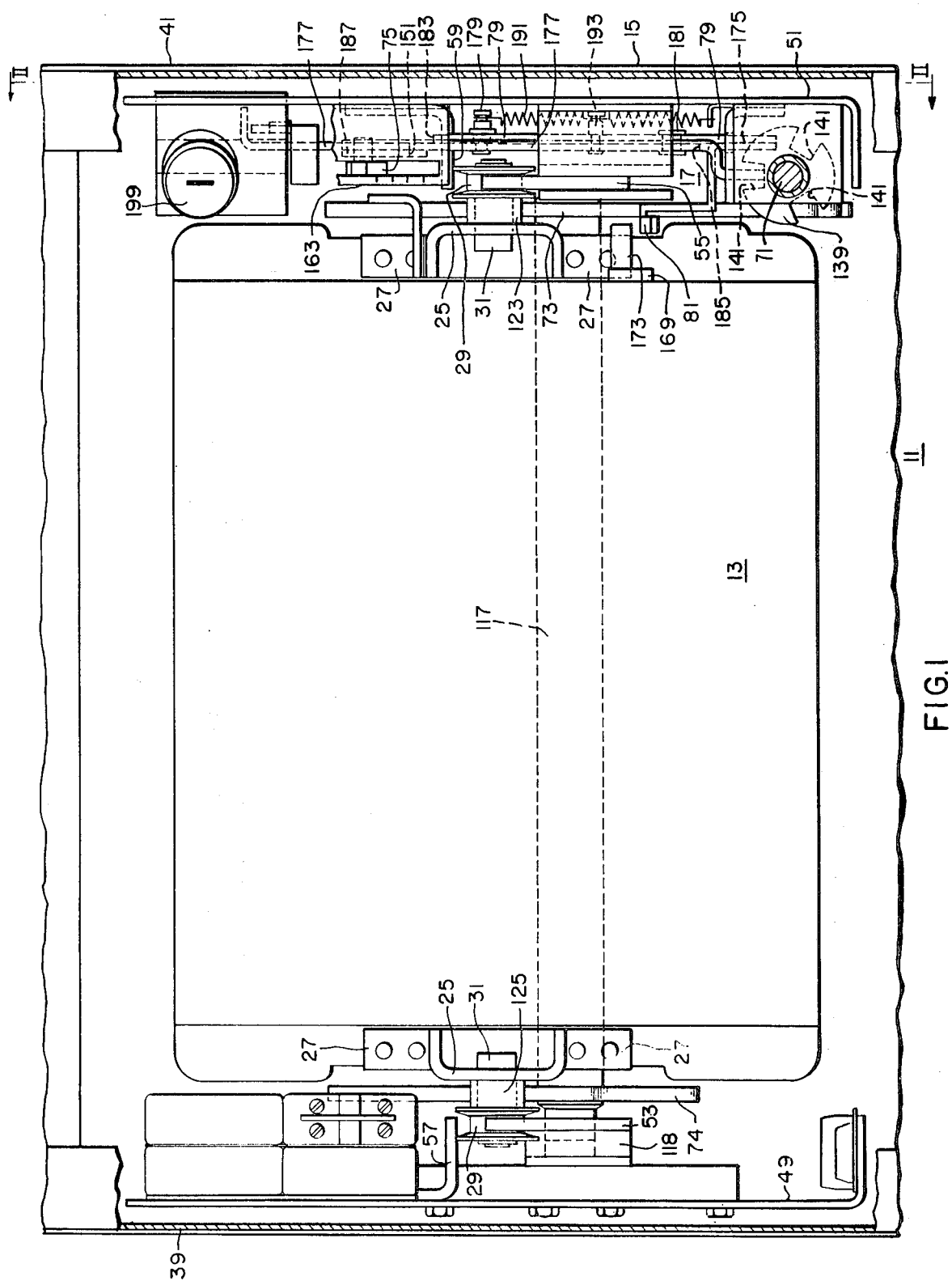
FIG. 1 is a front elevation view partly in section showing a circuit breaker within a cell.
Figure 2:
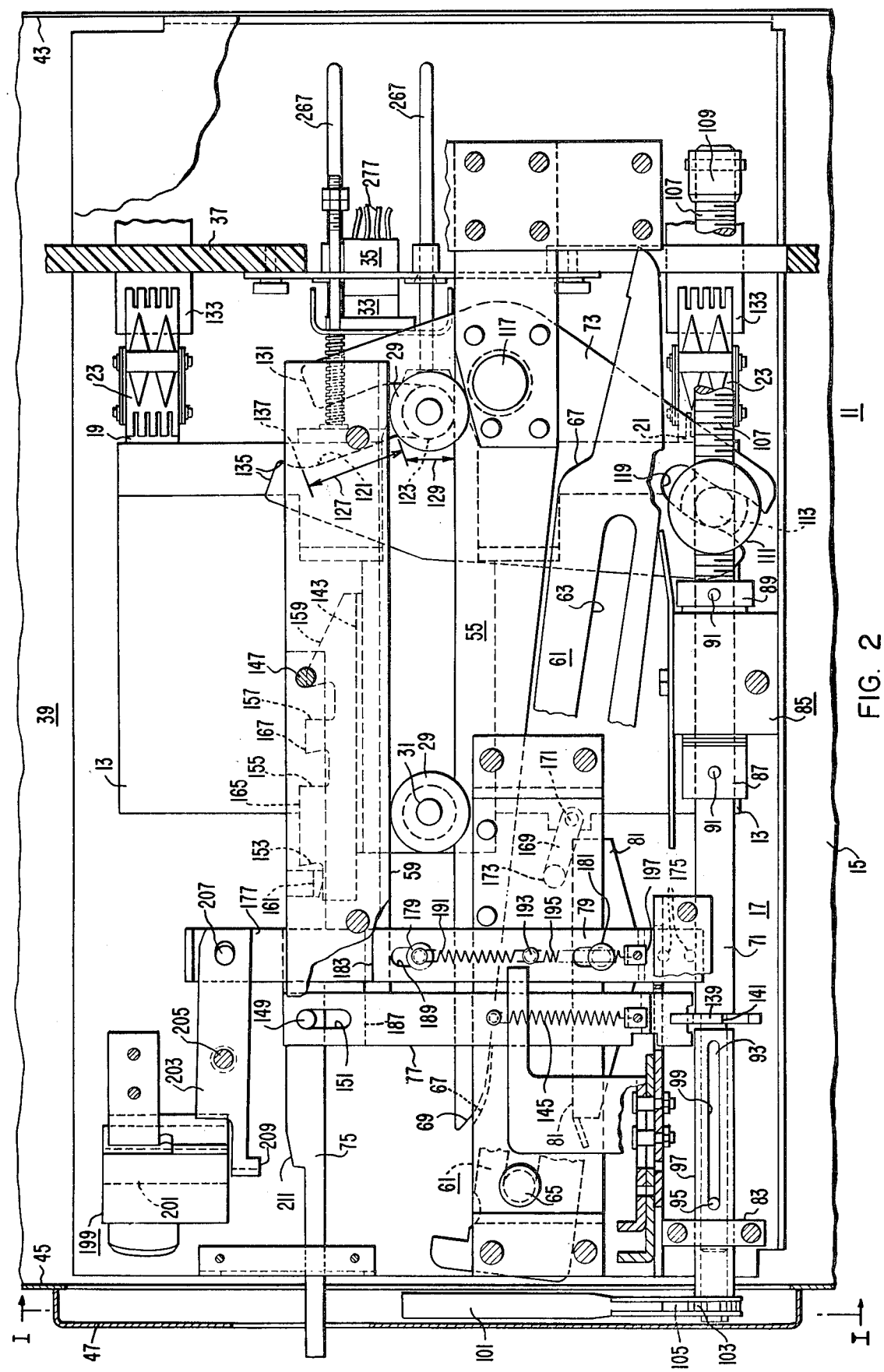
FIG. 2 is a vertical sectional view taken on the line II—II of FIG. 1.

In FIGS. 1 and 2 a drawout switchgear is generally indicated at 11 and it comprises a circuit interrupter or circuit breaker 13, a cell 15, and a levering-in mechanism generally indicated at 17. The circuit breaker 13 is similar in construction and operation to that disclosed in U.S. Pat. No. 3,869,192 entitled "Circuit Breaker With Preloaded Terminal Connectors" of which the inventors are Alfred E. Maier and James O. Rexroad. The circuit breaker 13 is contained in a molded housing composed of high strength phenolic resin reeinforced with glass fiber. As shown in FIG. 2 terminals 19, 21 extend from the rear wall of the housing. Similar terminal connectors 23 are mounted on each terminal 19, 21.

As shown in FIG. 1 a pair of similar brackets 25 is mounted on opposite sides of the circuit breaker 13 by flanges 27. Similar wheels or rollers 29 (FIGS. 1 and 2) are mounted on similar axles or pins 31 extending from the brackets 25.

In addition to the terminals 19, 21 and terminal connectors 23, secondary connectors or contacts 33 (FIG. 2) are retractably mounted on the rear wall of the circuit breaker 13 for engagement with corresponding secondary connectors or contacts 35 mounted on a rear wall 37 of the cell 15. The construction and operation of the secondary connectors, 33 and secondary contacts 35 are set forth below.

The cell 15 comprises opposite side walls 39, 41 (FIG. 1), a back wall 43, and a front opening 45 (FIG. 2). A door or cover 47 is disposed over the front opening 45 when the switchgear is in operation. Frame members 49, 51 are mounted on opposite sides of the cell 15 for supporting the circuit breaker 13. For that purpose a pair of tracks 53, 55 are provided for supporting the wheels 29 in a conventional manner. In addition, a hold-down flange 57, 59 is provided above each track 53, 55 for holding the wheels 29 down on their corresponding tracks. The tracks 53, 55 include similar retractable extensions 61 having elongated slots 63 which are mounted on a guide pin 65. When the circuit breaker 13 is in the completely installed or connected position (FIG. 2), the extension 61 is withdrawn in the retracted (solid line) position. The right end of the extension 61 includes a notch 67 which conforms with a corresponding tapered end portion 69 to enable alignment of the upper surfaces of the tracks 55 and the extension 61 when the extension is in the extended position.

LEVERING-IN MECHANISM

The levering-in mechanism 17 comprises an operating shaft 71, a cam 73, an indicating lever 75, and a locking link 77. In addition, there are means for tripping the breaker 13 when it is moved into or out of the cell 15 which means include a tripping link 79 and a trip rail 81.

The operating shaft 71 is journally mounted in spaced bearings 83, 85 where it is prevented from longitudinal movement by collars 87, 89 which have similar dowel pins 91. The left end of the operating shaft 71 includes a reduced portion 93 having a radially extending pin 95. A tube 97 is telescopically disposed on the portion 93 and includes a slot 99 in which the pin 95 is disposed. Accordingly, when the door 47 is opened, the telescopic portion may be extended to the left, so that a ratchet wrench or handle 101 may be rotated to turn the shaft 71. For that purpose the end of the tube 97 includes a ratchet 103 and the handle 101 is provided with a pawl 105 operative in the ratchet in a conventional manner.

The right end of the operating shaft (FIG. 2) is provided with a threaded part 107 with a block 109 on the end thereof. A nut 111 has a guide pin 113 and is mounted on the threaded portion 107.

Figure 3:
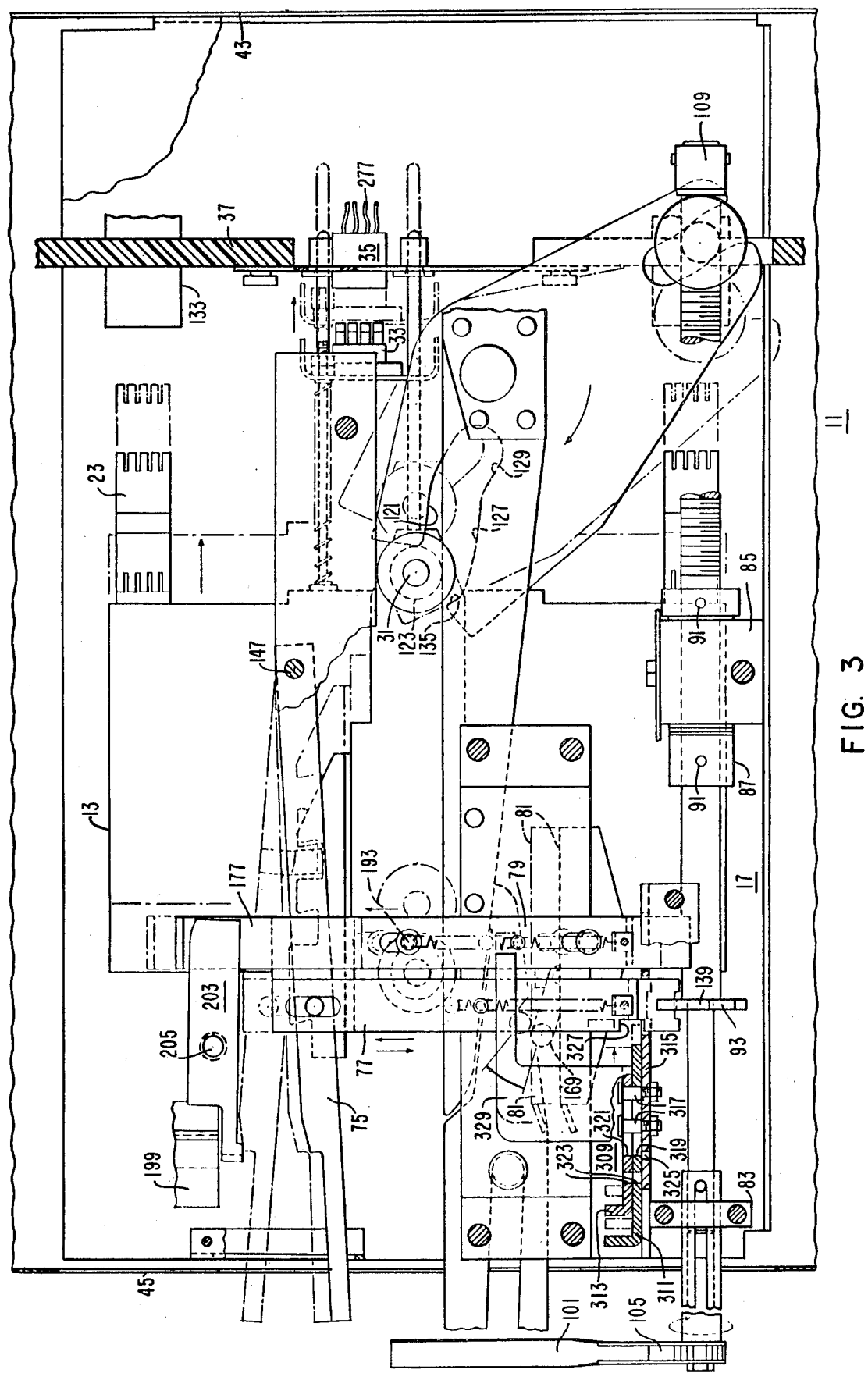
FIG. 3 is a vertical sectional view similar to FIG. 2 showing several of the operating parts in alternate positions.

The cam 73 is mounted on the cam shaft 117 in bearing blocks 118 at opposite ends extending from the frame. The second cam 74 (FIG. 1) is disposed on the opposite side of the circuit breaker 13 and is connected with the cam 73 by a cam shaft 117. The lower end of the cam 73 is provided with a slot 119 in which the pin 113 is disposed. Thus, as the nut 111 moves along the threaded part 107 of the operating shaft 71 the pin moves the cam to the position shown in FIG. 2 which corresponds with the connected or closed position of the terminals. In the disconnected position as shown in FIG. 3, the slot 119 is arcuate to enable smooth rotation of the cam 73. As the pin 113 moves to the right, the cam 73 rotates counterclockwise so that the pin 113 moves completely into the slot 119 and out again as the nut reaches the right end of the threaded part 107.

The cam 73 also includes a cam slot 121 which functions with the circuit breaker 13 for moving it between the disconnected position, the intermediate or test position, and the connected position. For that purpose the cam slot 121 engages the pin or axle 31 on which a bushing 123 is mounted to enable smooth movement of the axle pin 31 in the cam slot 121. On the other side of the circuit breaker 13 (FIG. 1) a bushing 125 is similarly mounted on the pin or axle 31 to cooperate with a cam slot (not shown) in the cam 74, whereby the cams 73, 74 operate simultaneously to move both sides of a circuit breaker 13 and prevent binding between the wheels 29 and their corresponding tracks 53, 55.

The cam slot 121 which extends inwardly from the periphery of the cam 73 and comprises an outer segment and an inner segment as indicated by the arrows 127, 129, which segments are disposed at different angles with respect to each other. As shown more particularly in FIG. 3, when the cam 73 is in the disconnected position, upon insertion of the circuit breaker into the cell, it is moved inward manually until the bushings 123, 125 (FIG. 1) strikes a peripheral portion 131, whereby further insertion of the circuit breaker 13 is prevented (FIG. 3). At this location the terminal connectors 23 are in the disconnected positions with respect to terminal stabs 133, and secondary connectors 33 are disconnected from the secondary connector terminals 35 as shown. If the cam is rotated to connected position with the breaker out of the cell, the edge of the cam also stops the breaker with the primary and secondary terminals in the disconnected position.

Upon clockwise rotation of the cam 73 a second peripheral portion 135 engages the bushing 123 and the bushing engages the cam surface 127 to move the circuit breaker to the right (FIG. 3) until the axle 31 and bushing 123 reach the lower end of the outer cam portion 127. At this location the secondary connectors 33 engage the second connector terminals 35 (FIG. 3), but the terminal connectors 23 are still disengaged from the terminal stabs 133.

Further rotation clockwise of the cam 73 causes the bushing 123 to move into the inner cam segment 129. The angle of the inner cam segment 129 is different from the angle of the outer segment 127 so that the circuit breaker 13 moves at a slower speed for a uniform speed of rotation of the operating shaft 71. For the second portion of rotation of the cam 73, the terminal connectors 23 move toward the terminal stabs 133 at a slower speed and with greater force. The connection with the terminal slabs 133 is completed when the bushing 123 reaches the lower end of the inner segment 129 of the slot 121.

The levering-in mechanism 17 also includes means for locking the circuit breaker 13 in any one of the three positions; namely, the disconnected, the intermediate or test, and the connected positions. The means include a flange 139 (FIGS. 1, 2) having three spaced notches 141; the locking link 77; a lever 75; and a position-indicating bracket 143. In the connected position (FIG. 2) the lower end of the link 77 is disposed in one of the notches 141, thereby preventing rotation of the operating shaft 71. A coil spring 145 normally holds the link 77 in the lower position and is intended to overcome any restraining forces that would prevent the link from being in the indicated position.

Figure 3A:
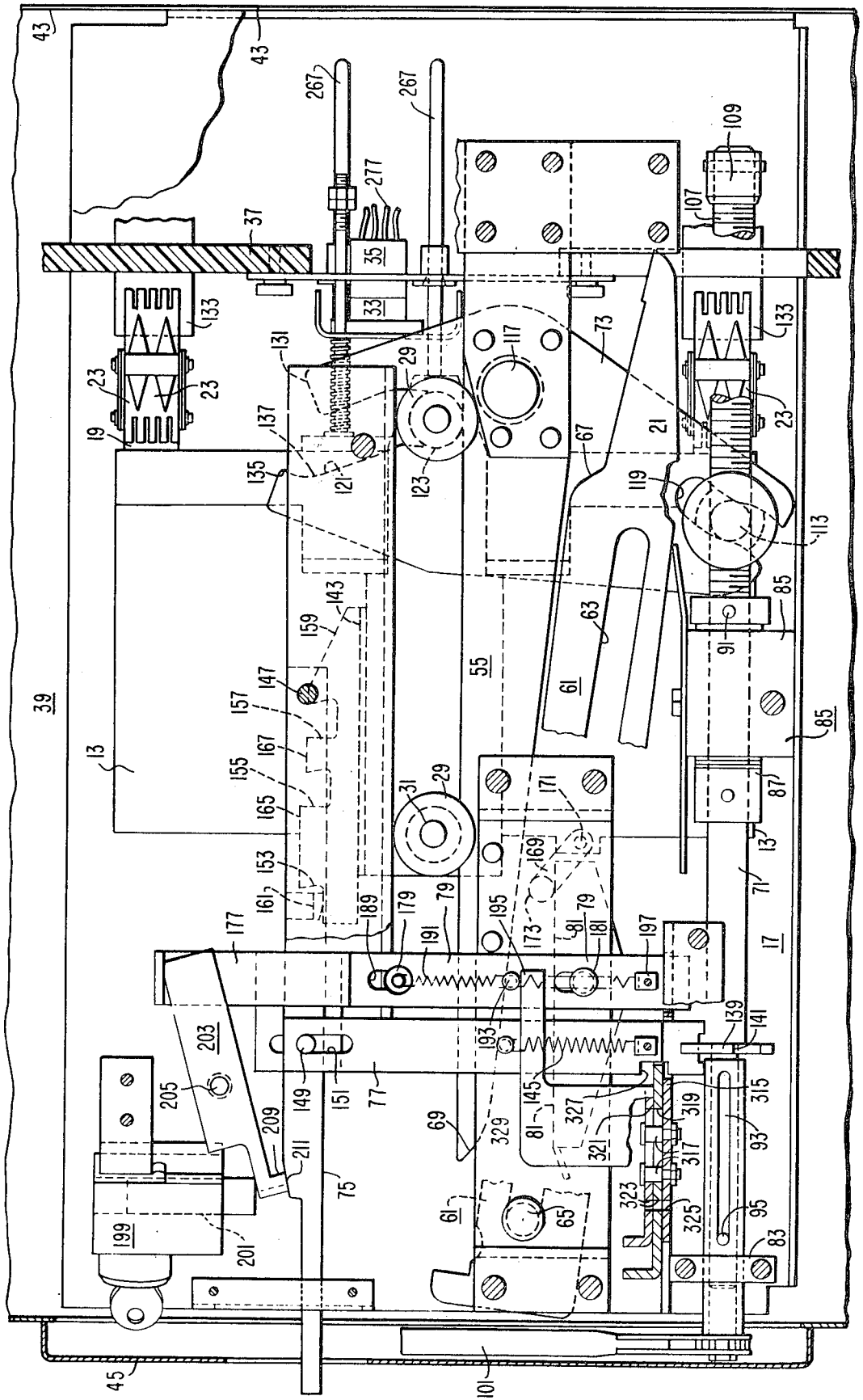
FIG. 3A is a vertical sectional view similar to FIG. 3 showing the several parts in other positions.

The lever 75 is pivoted at 147 and is connected to the link 77 by a pin 149 and a slot 151. Manifestly, lifting the lever 75 is usually necessary to rotate the operating shaft 71. The position-indicating bracket 143 includes three spaced notches 153, 155, and 157, one for each of the disconnected, intermediate, and connect positions of the circuit breaker 13. The bracket also includes an inclined surface 159. A tab 161 on the lever 75 is disposed in one of the notches 153, 155, 157 corresponding to the positions of the circuit breaker 13. When the tab 161 is in one of said notches, it is necessary to lift the front (left) end (FIG. 2) of the lever 75 to move the circuit breaker between one of the indicated positions. Accordingly, when the tab 161 is in the notch 153, the circuit breaker is in the connected position and it cannot be removed therefrom without lifting the lever 75 (FIG. 3A). Likewise, when the tab is in the notch 155 or 157 the circuit breaker 13 is in the intermediate or disconnected position, respectively. In the latter position it is necessary to once again lift the lever 75 in order to fully withdraw the circuit breaker from the cell. Conversely, when the circuit breaker 13 is moved into the cell 15, the tab 161 rides up the inclined surface 159 of the bracket 143 which is mounted on the circuit breaker 13. Continued manual movement of the circuit breaker 13 into the cell causes the tab 161 to drop into the notch 157, whereupon the wheel 29 encounters the peripheral portion 131 of the cam 73. Subsequent movement of the circuit breaker 13 into the cell is accomplished by the levering-in mechanism 17 in the manner set forth above.

During that levering-in function, however, the tab 161 successively drops into the notches 155, 153, and the operating shaft 71 is free to rotate only upon lifting the lever 75. Each notch 153, 155, 157 has a bottom surface at a different level upon which the tab 161 rests when in the particular notch. As a result the outer or left end of the lever 75 is disposed at different positions as indicated by a position scale 163 (FIG. 1) as an indication to an operator of the particular position of the circuit breaker in the cell. Likewise, the upper sides 165, 167 are disposed at different levels to further indicate on the scale 163 the positions of the circuit breaker between the positions corresponding to the notches.

TRIP MECHANISM

Whenever the circuit breaker is moved into or out of the connected position (FIG. 2), it is desirable to trip the contacts (not shown) within the circuit breaker 13 for safety of personnel and equipment. Accordingly, a trip lever 169 which is mounted on a shaft 171 extending into the circuit breaker 13 for actuating a tripping mechanism therein, is provided externally of the circuit breaker with a trip pin 173 located at the end opposite the lever 169. The pin 173 is disposed above the trip rail 81 so that lifting of the rail 81 moves the lever 169 clockwise through the prescribed angle, such as 28°, thereby tripping the circuit breaker 13. As shown in FIGS. 1 and 2 the trip rail 81 is a substantially Z-shaped member which is joined at 175 to the lower end of the trip link 79.

The link 79 is a two-part member of which the link 79 is a lower part with an upper part or link 177 attached thereto by rivets 179, 181. The upper end of the link 79 terminates at 183 and the lower end of the link 177 terminates at 185. The link 177 includes a bracket 187 which is secured thereto in a suitable manner such as spot welding. The bracket 187 extends over the upper end portion of the adjacent lock link 77 and includes a slot aligned with the slot 151. Thus, when the position-indicating lever 75 (FIG. 3A) is raised to unlock the operating shaft 71, the upper link 177 moves therewith. The rivet 179 extends through a slot 189 and is attached to the upper end of a coil spring 191. The lower end of the spring 191 is attached at a pin 193 to the link 79. Accordingly, when the link 177 is raised, the lower link 79 is also raised by the spring 191 which in turn moves the trip rail 81 upwardly to rotate the lever 169 and trip the circuit breaker 13. A return spring 195 is provided between the pin 193 and a bracket 197 on the cell to prevent the assembly of the trip links 79, and bracket 197 from being "hung up" and thereby otherwise preventing the trip rail 81 from returning to the lower position.

The circuit breaker 13 may also be tripped for maintenance reasons when it is unnecessary to remove the circuit breaker from the cell. For that purpose a key lock 199 including a plunger 201 is provided. When the plunger 201 is lowered, it rotates a lock lever 203 about a pin 205, thereby raising the upper end of the link 177 via a pin 207. Thus, the trip rail 81 may be raised to hold the trip lever 69 in the trip position so long as the lock 199 is in use.

In addition, when the lever 203 is rotated clockwise the end portion 209 is brought into contact with the position-indicating lever 75 at a surface 211 to prevent unlocking of the operating shaft 71.

TERMINAL CONNECTOR

Figure 4:
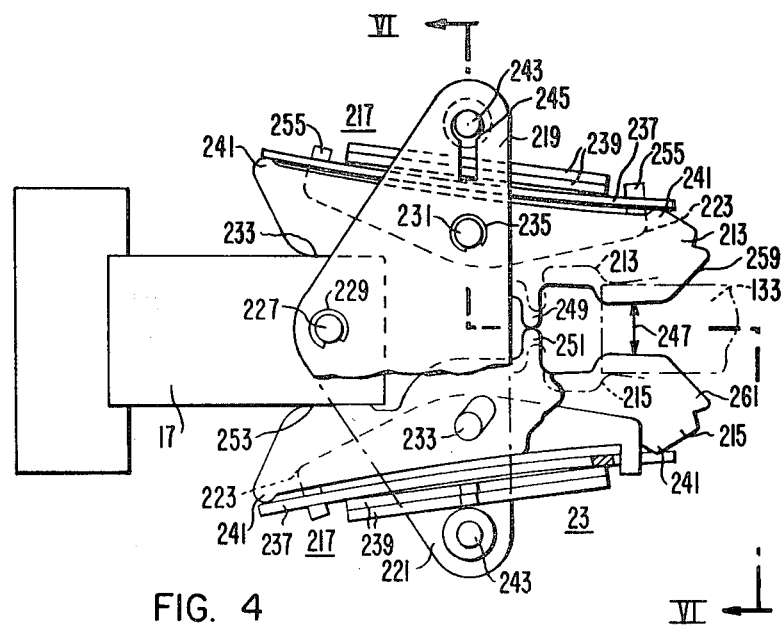
FIG. 4 is a plan view of a contact structure.
Figure 5:
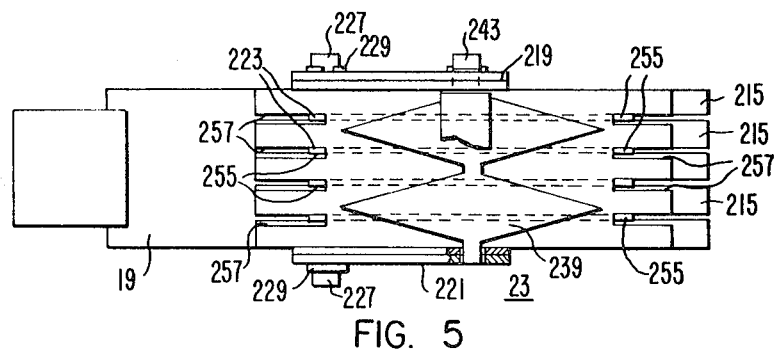
FIG. 5 is an elevational view of the contact structure.
Figure 6:
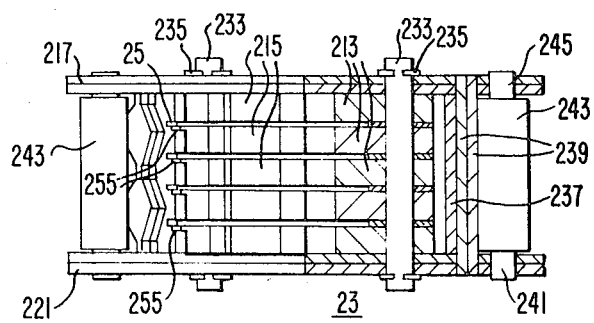
FIG. 6 is a vertical sectional view taken on the line VI—VI of FIG. 4.

The construction and operation of the terminal connector 23 is shown more particularly in FIGS. 4, 5, and 6. The terminal connector 23 comprises a plurality of pairs of oppositely disposed contact fingers 213, 215, similar biasing means 217 on each side thereof, and brackets 219, 221 for holding the assembly together. The contact fingers 213, 215, being oppositely disposed in a plurality of pairs of contact fingers, are separated by spacers 223. The several contacts 213 are disposed on one side of the longitudinal axis 225 while the contact fingers 215 are disposed on the opposite side thereof. The left end (FIG. 4) of the contact fingers 213, 215 are compactly located together with the spacer 223 between triangularly shaped brackets 219, 221 in the manner of a sandwich. A pin 227 having a retaining ring 229 extends through the brackets 219, 221 and the terminal 17. Likewise, pins 231, 233 with corresponding retaining rings 235 extend through aligned apertures of the several contact fingers 213 in spacers 223 on one side, and the contact fingers 215 in spacers 223 on the other side.

The biasing means 217 comprises an assembly of leaf springs including an elongated leaf spring 237 in a plurality such as two backup leaf spring 239. The longer leaf springs 237 extend between spaced protuberances 241 on the outer surfaces of the several contact fingers 213 on one side and contact fingers 215 on the other side. Similar compression pins 243 extend between spaced openings 245 and opposite pins of the brackets 219, 221. The spacing between the pins 243 is such that the leaf springs 237, 239 are compressed at their centers between the protuberances 249. As a result, the biasing means 217 compresses the oppositely disposed contact fingers 213, 215 together with a spacing 247 maintained oppositely disposed projections 249, 251 as well as contact surfaces 253 between the contact fingers and the terminal 17. Each spacer 223 comprises a pair of upturned protuberances or ears 255 which extend through corresponding notches 257 in the leaf springs 237. The notches 257 are aligned with the spacings between the several contact fingers 213, 215. Thus, the several contact fingers 213, 215 are maintained in properly spaced positions adjacent to each other. Finally, the leading edges of the several aligned contact fingers 213, 215 are inclined at 259, 261 to enable mounting of the terminal connector 23 on the stab 133 where the bias means 217 maintains good electrical clamping contact.

RETRACTABLE SECONDARY CONTACTS

Figure 8:
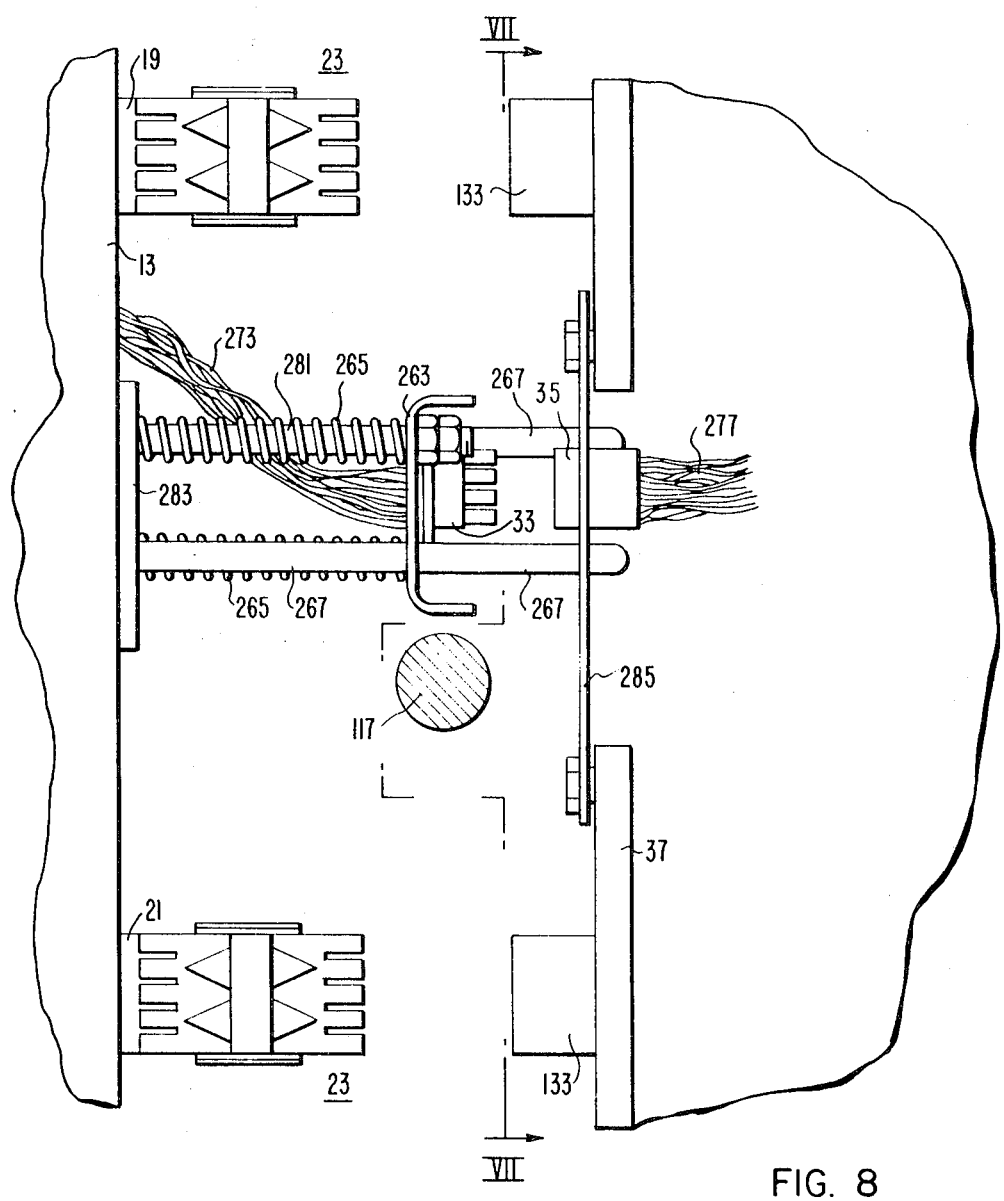
FIG. 8 is an enlarged view of the several contacts in the disconnected positions.

As was set forth above, as the circuit breaker is moved into the cell, it moves through the disconnected, intermediate or test, and connected positions. In the disconnected position of FIG. 8, the terminal contactors 23 are disengaged from the terminal stabs 133 and the secondary connectors 33 are disengaged from the secondary connector terminals 35. In the intermediate or test position, the secondary connectors 33 engage the secondary connector terminals 35 (FIG. 9); however, the terminal connectors 23 are disconnected from the terminal stabs 133. Finally, when the circuit breakers moves to the connected position, the terminal connectors 23 engage the terminal stabs 133 with the secondary contacts 33, 35 still in engagement.

Figure 7:
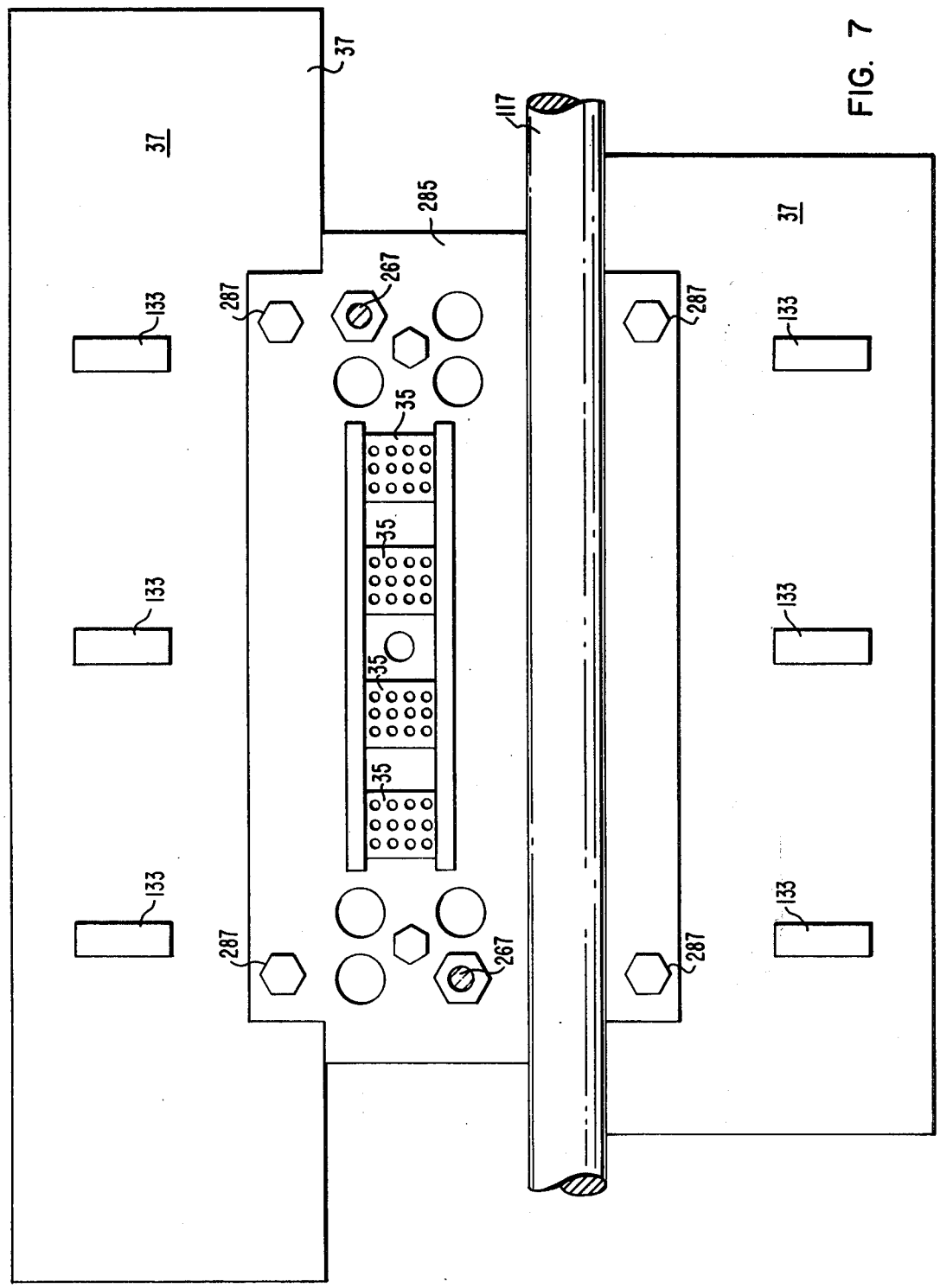
FIG. 7 is a vertical sectional view taken on the line VII—VII of FIG. 8.
Figure 10:
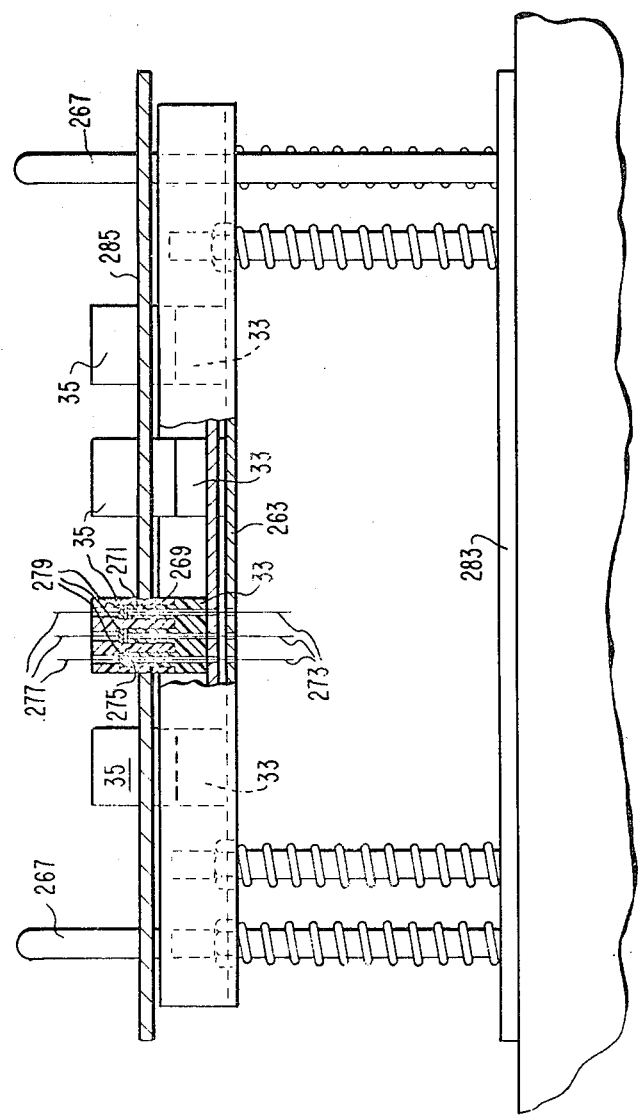
FIG. 10 is a plan view taken on the line X—X of FIG. 9.

For that purpose, the secondary connectors 33 are mounted on a retractable means comprising a mounting plate 263, biasing springs such as coil springs 265, and guide pins 267. As shown in FIG. 10, the secondary connector 33 comprises a plurality of tubular projections 269 which fit into corresponding sockets 271 of the secondary contactor terminals. A conductor wire 273 extends into each projection 269 and at its inner end is provided with a button contact 275. Similarly, a conductor wire 277 extends into each socket 271, and button contacts 279 are attached to the inner ends of said conductor wires. When the secondary contactors and terminals 33, 35 are assembled (FIG. 10), good electrical contact exists between the contacts 275, 279, and as the circuit breaker 13 is advanced from the intermediate to the connected positions, the retraction means begins to function. The coil springs 265 are supported on mounting bolts 281 which extend between the mounting plate 263 and a support plate 283 on the back wall of the circuit breaker 13. The guide pins 267 (FIG. 7) are preferably diagonally disposed with respect to the secondary contact terminals 35 and extend through the corresponding apertures in a mounting plate 285 which precede the engagement of the secondary connectors and terminals 33, 35. The mounting plate 285 is mounted on the rear wall 37 by space bolts 287 and is free to shift laterally and vertically with respect to the approaching secondary contacts 33 as the guide pins 267 enter corresponding holes 289 in the mounting plate 285.

Figure 9:
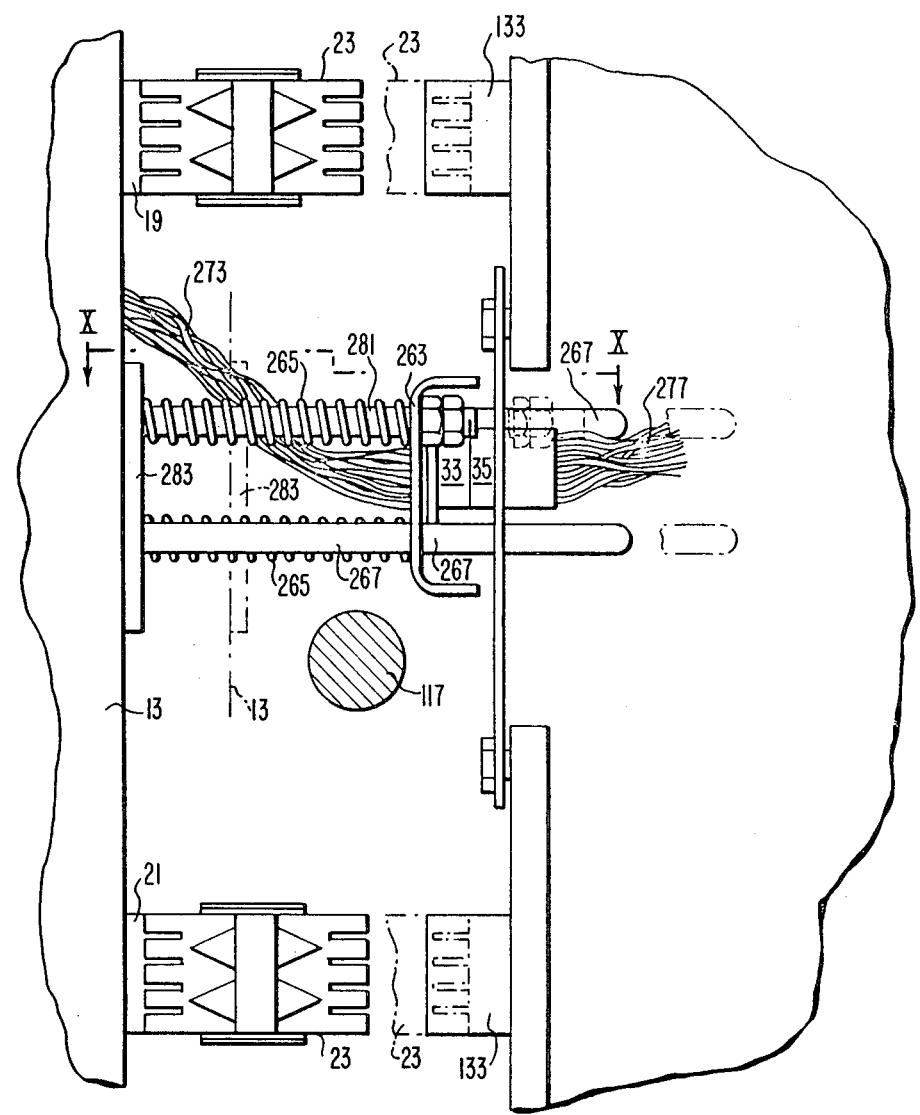
FIG. 9 is a view similar to FIG. 8 but showing the primary and secondary terminal means in the disconnected position and the secondary contact means in the closed position, and showing in broken line the connected position of the primary and secondary terminal means.

After the secondary contacts and terminals 33, 35 are completely engaged, the coil springs 265 contract as the circuit breaker continues to move to the connected position until the circuit breaker and support plate 283 reach the broken line positions (FIG. 9).

Figure 11:
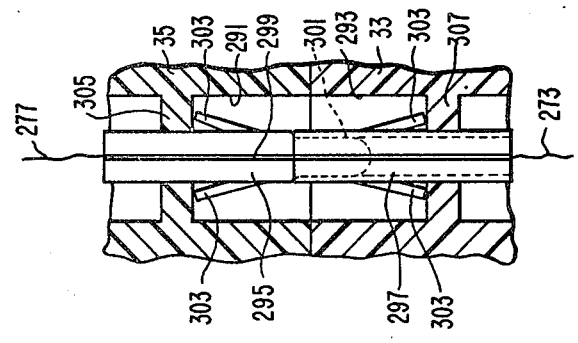
FIG. 11 is a sectional view of another embodiment of the secondary contact means.

Another embodiment of the secondary contacts is shown in FIG. 11, wherein the secondary connectors 33 and secondary connector terminals 35 each comprise a plurality of spaced apertures 291 and 293. A pin contact 295 is mounted within each aperture 291 and a corresponding socket contact 297 is mounted within each aperture 293. Both contacts 295 and 297 have similar longitudinal slots 299 to allow for slight expansion of the socket contact 297 and contraction of the pin contact 295 when they are engaged with an end portion 301 of the pin contact seated in the socket contact. The contacts 295 and 297 have similar spurs 303 to reinforce the contacts in place as they slide together, with the spurs engaging mounting flanges 305 and 307 of the connector 33 and terminals 35.

The device is also provided with padlock locking means 309 for the safety of maintenance personnel who from time to time must correct some irregularity on the line leading from the switchgear. For that purpose a pair of lock members or slides 311 and 313 (FIG. 3) are mounted on a frame 315. A pair of similar mounting pins 317 extend from the frame 315 and through aligned slots 319, 321 in the slides 311, 313, respectively. Similar holes 323 for padlock shackles (not shown) are provided in each slide 311, 313 which holes are aligned with a corresponding hole 325 in the frame 315 when the slides are in locked positions (FIG. 3A). In the locked position the right end of the slide 311 is disposed in a notch 327 of the link 77, thereby preventing the rotation of the shaft 71. In addition, the slide 313 comprises a locking bracket 329 which moves with the slide from the unlocked position (FIG. 3) to the locked position (FIG. 3A) when the slide is padlocked in place. In the latter position (FIG. 3A), the bracket 329 extends under the pin 193 on the link 79 to hold the trip rail 81 in the tripped position of the circuit interrupter, and thereby prevents the circuit interrupter from being inadvertently closed until the locking slides 311, 313 are withdrawn to their unlocked positions.

What is claimed is:

1. Drawout switchgear comprising a cell having an opening at the front thereof, the cell comprising a rear wall opposite the opening, a circuit interrupting unit movable into and out of the cell, first stationary terminal means supported on the rear wall, second stationary terminal means supported on the rear wall, first contact means supported on the rear wall, first and second movable terminal means on said unit and connectable with the corresponding stationary terminal means, second contact means on said unit and connectable with the first contact means, said unit being movable between disconnected, intermediate, and connected positions, of the terminal means and of the contact means, corresponding first and second terminal means being connected only when said unit is in the connected position, corresponding first and second contact means being connected only when said unit is in and between the intermediate and connected positions, the spacing between the first and second contact means being less than that between the corresponding first and second terminal means when said unit is between the disconnected and intermediate positions, and biasing means mounting one of the contact means in connection with the other contact means to effect contraction of the biasing means when said unit moves to the connected position and to effect expansion of the biasing means when said unit moves away from the connected position.

2. The drawout switchgear of claim 1 in which the second contact means is supported by the biasing means.

3. The drawout switchgear of claim 2 in which biasing means comprises spring means for yieldingly holding the second contact means in an extended position.

4. The drawout switchgear of claim 3 in which the biasing means comprises guide means extending between the unit and the rear wall for tracking movement of the second contact means.

5. The drawout switchgear of claim 4 in which the spring means comprises coil springs on the guide means.